(12) United States Patent
Straw et al.

(10) Patent No.: US 10,684,928 B1
(45) Date of Patent: Jun. 16, 2020

(54) INTELLIGENT STORAGE MEDIA TRAY FOR IDENTIFICATION AND REPLACEMENT OF FAILED STORAGE DEVICE IN DISTRIBUTED STORAGE SYSTEMS

(71) Applicant: SOFTIRON LIMITED, Southampton (GB)

(72) Inventors: Phillip Straw, Fremont, CA (US); Harry Richardson, Essex (GB); Robert Drury, San Mateo, CA (US); Martin Raumann, San Leandro, CA (US); David Anders, Hurst, TX (US)

(*) Notice: Subject to any disclaimer, the term of this patent is extended or adjusted under 35 U.S.C. 154(b) by 305 days.

(21) Appl. No.: 15/856,948

(22) Filed: Dec. 28, 2017

(51) Int. Cl.
G06F 11/30 (2006.01)
G06F 11/20 (2006.01)
G06F 11/32 (2006.01)

(52) U.S. Cl.
CPC ...... *G06F 11/2094* (2013.01); *G06F 11/3006* (2013.01); *G06F 11/3034* (2013.01); *G06F 11/3055* (2013.01); *G06F 11/326* (2013.01); *G06F 2201/805* (2013.01)

(58) Field of Classification Search
CPC ... G06F 11/325; G06F 11/326; G06F 11/3034
See application file for complete search history.

(56) References Cited

U.S. PATENT DOCUMENTS

| | | | | |
|---|---|---|---|---|
| 6,050,425 A * | 4/2000 | Kappel | ............... | A47B 43/02 211/40 |
| 6,392,884 B1 * | 5/2002 | Chou | ............... | G06F 1/184 360/98.01 |
| 6,406,257 B1 * | 6/2002 | Houdek | ............... | F04D 25/166 415/213.1 |
| 6,608,564 B2 * | 8/2003 | Post | ............... | G06F 13/4081 340/693.12 |
| 6,907,500 B2 * | 6/2005 | Suzuki | ............... | G06F 11/006 711/114 |
| 7,613,843 B1 * | 11/2009 | Dhandapani | ............... | G06F 3/0605 710/15 |
| 2003/0046470 A1 * | 3/2003 | Sivertsen | ............... | G06F 3/0607 710/304 |

(Continued)

OTHER PUBLICATIONS

Bussing et al. "Spacecraft Erasable Disk Mass Memory (EDMM)". Aug. 1993. (Year: 1993).*

*Primary Examiner* — Yolanda L Wilson (57) ABSTRACT

A storage server receives a control signal indicating that a specific storage device of a plurality of storage devices housed by a specific storage media tray has failed. The storage media tray is in turn housed by the specific storage server, which can house many such trays. In responsive to receiving the control signal, the server activates a visual fault indicator on an external display panel, indicating that the storage server contains a storage media tray housing a failed storage device. An external visual indicator on the specific storage media tray is activated to indicate that the specific storage media tray houses a failed storage device. The specific storage media tray activates an internal visual indicator identifying the specific storage device which has failed in the specific storage media tray. When the specific failed storage device has been replaced with a working storage device, the indicators are deactivated.

33 Claims, 7 Drawing Sheets

(56) References Cited

U.S. PATENT DOCUMENTS

| | | | |
|---|---|---|---|
| 2004/0257760 A1* | 12/2004 | Record | G11B 33/022 |
| | | | 361/679.32 |
| 2013/0080697 A1* | 3/2013 | Dhandapani | G06F 11/3034 |
| | | | 711/114 |
| 2015/0347259 A1* | 12/2015 | Katou | G06F 3/048 |
| | | | 348/143 |
| 2015/0366095 A1* | 12/2015 | Junkins | H05K 5/0256 |
| | | | 361/679.31 |
| 2016/0057886 A1* | 2/2016 | Harvilchuck | G06F 1/185 |
| | | | 361/679.31 |

* cited by examiner

INTELLIGENT STORAGE MEDIA TRAY FOR IDENTIFICATION AND REPLACEMENT OF FAILED STORAGE DEVICE IN DISTRIBUTED STORAGE SYSTEMS

TECHNICAL FIELD

The present disclosure relates generally to storage media, and more specifically to identifying and safely replacing a failed storage device within a distributed storage system.

BACKGROUND

Storage servers, especially those configured for use in distributed storage systems, contain many storage devices. This makes it highly likely that there will be multiple storage device failures over the lifetime of a storage server. Because of this, storage servers are designed so that storage devices may be "hot-swapped," or replaced without powering down the server.

Storage servers within distributed storage systems (i.e. storage systems comprising multiple storage servers that communicate in order to act as a single coherent service), could possibly have tens of storage devices, with the distributed storage system itself comprising thousands of storage servers. Because of this it becomes extremely problematic and laborious to easily identify and "hot-swap" a failed storage device in such an architecture having potentially millions of storage devices. First of all, it is difficult for a technician to identify a specific storage server that contains the failed storage device. Even if the technician manages to identify the storage server housing the failed storage device, there is no way he can immediately and readily identify the failed storage device within the server which houses many storage devices including the failed one.

Further, distributed storage systems are built to expect storage device failures, and ensure that data is not lost when a storage device fails. Existing distributed storage systems achieve this by storing any given piece of data multiple times, such that each of the copies/replicas are stored on different storage devices, and usually on different servers, so that the distributed storage system is not affected if a storage device or server fails. If a client tries to access data on a storage device that has failed, it is automatically redirected to retrieve the data from one of the replicas.

The exact number of replicas maintained by a distributed storage system is a policy decision and is a trade-off between how important the data is and how much extra cost will be incurred by having to buy more storage devices to hold the redundant copies. When a storage device fails or is decoupled from a server in such a distributed storage system, the system notices this and makes new replicas of the data that was contained in the failed storage device and/or the other storage devices that have also been decoupled from the server housing the storage device by copying the data from the remaining replicas stored on other servers in order to get back to the required level or redundancy. This process is called replication, and is costly in terms of both network traffic and server loading. However, when a storage device fails, if the failed device is not replicated, the level of redundancy and hence reliability of the distributed storage system is no longer maintained.

Referring back to the initial problem of replacing a failed storage device within the aforementioned distributed storage system, we are faced with the problem of replicating not only the failed storage device but also, replicating any working storage device that may be knowingly or unknowingly decoupled from the server in the process of identifying and replacing a failed storage device. This results in significant network and CPU utilization, which is unnecessary and usually leads to wasteful use of system resources, as the working storage devices will soon be coupled again to the storage server, and therefore need not have their data replicated.

It would be desirable to resolve these issues.

SUMMARY

The use of intelligent storage media trays facilities identifying and safely replacing failed storage devices within a distributed storage system. In one embodiment, a storage server receives a first control signal indicating that a specific storage device of a plurality of storage devices housed by a specific storage media tray has failed. The storage media tray is in turn housed by the specific storage server, which can house many such trays. In responsive to receiving the control signal, the server activates a visual fault indicator (e.g., an LED or the like) on an external display panel, indicating that the storage server contains a storage media tray housing a failed storage device. An additional indicator on the external display panel can further indicate how many failed storage devices the storage server contains. An external visual indicator (e.g., another LED or the like) on the specific storage media tray is activated to indicate that the specific storage media tray houses a failed storage device. Typically, the external visual indicator on the storage media tray is viewable while the specific storage media tray is still housed in the storage server, once the cover has been removed. In addition, the specific storage media tray activates an internal visual indicator identifying the specific storage device which has failed in the specific storage media tray. When the specific failed storage device has been replaced with a working storage device, the visual fault indicator, the internal visual indicator, and the external visual indicator can be deactivated.

The storage server may be one of a plurality of storage servers in a distributed storage system, the plurality of storage servers being communicatively coupled to each other to facilitate retrieving and storing data in a fault tolerant scheme providing data replication. The storage server may programmatically classify the specific failed storage device housed in the specific storage media tray as a storage device that has failed, and programmatically classify the other storage devices housed in the specific storage media tray as storage devices that have not failed. The storage server may then initiate the adaption of the fault tolerance scheme based on these classifications, for example by transmitting a corresponding notification to the distributed storage system. The adaptation can comprise replicating contents of the specific failed storage device on at least one other storage device in the distributed storage system to maintain the specific fault tolerance level of the fault tolerance scheme, while preventing the distributed storage system from replicating contents of the storage devices housed in the specific storage media tray that have not failed.

In one embodiment, responsive to detection of the actuation of an actuating member (e.g., the pressing of a button) of the specific storage media tray, a first visual indication is provided by the specific storage media tray, indicating that the actuating member has been actuated (e.g., the button press has been detected). In response to the button press, all of the storage devices housed in the specific storage media tray can be programmatically classified as being out of the distributed storage system, and the storage server can transmit a corresponding notification to the distributed storage system. In response to receiving an acknowledgement of the transmitted notification from the distributed storage system, a second visual indication may be provided by the specific storage media tray, indicating that the specific storage media tray may now safely be decoupled from the storage server.

When the specific media tray has been decoupled from the storage server, an internal visual indicator on the specific storage media tray that is positioned in a specific physical proximity to the specific failed storage device becomes viewable. This identifies the specific storage device that has failed and needs to be replaced with a working storage device.

It is to be understood that the language used in the present disclosure has been principally selected for readability and instructional purposes, and is not intended to limit the scope of the subject matter disclosed herein.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The technology disclosed herein includes various aspects, such as systems, methods, apparatuses, computer-readable media, computer program products, etc., for identifying and safely replacing a failed storage device housed by an intelligent storage media tray which is in turn housed by a specific storage server or other computing device, for example on a specific rack in a datacenter, in the context of a distributed storage system.

When a storage device housed in an intelligent storage media tray in a given storage server fails, an external indicator on the server is activated, such as an LED on the casing. A technician is thus able to readily identify storage servers with failed storage devices that need to be replaced. An external indicator on the given intelligent storage media tray housing the failed storage device is also activated, so that once the technician removes the casing of the storage server, s/he can easily identify which tray needs to be decoupled in order to replace the failed drive. The technician presses a button or the like on the given storage media tray, and an indicator is activated (e.g., a red or yellow LED light) to indicate acknowledgement of the button push. As described in detail below, the storage server communicates with the distributed storage system concerning the classification of the storage devices housed by the tray, and a visual indicator is activated when the technician may safely decouple the storage media tray from the server (e.g., a green LED is light). When the technician decouples the tray, another LED or other indicator physically proximate to the failed storage device enables the technician to ascertain which device needs replacing. The technician can then replace the failed storage device, and recouple the storage media tray to the storage server.

It should be understood that the above list of features and advantages is not all-inclusive and many additional features and advantages are contemplated and fall within the scope of the present disclosure.

Figure 1:
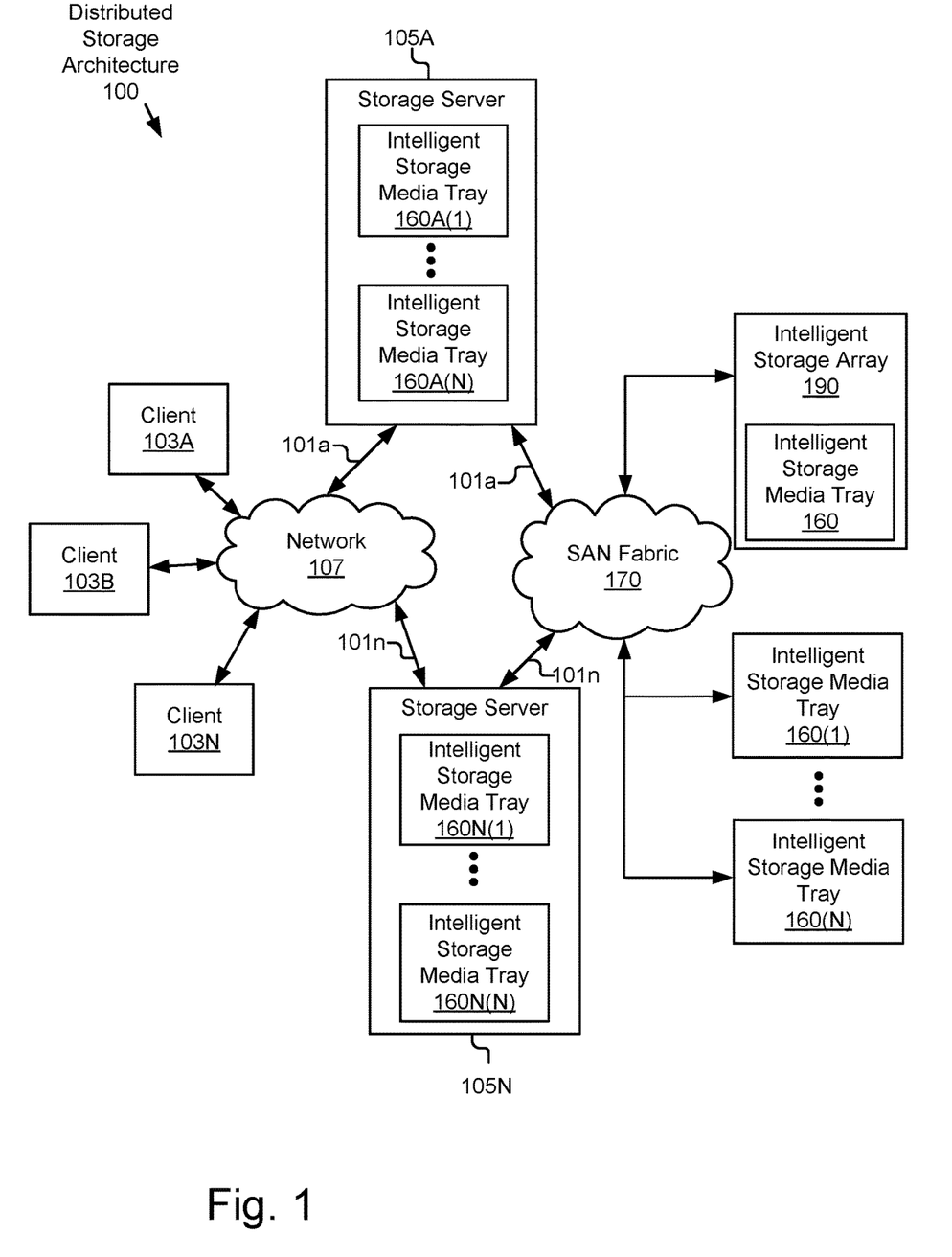
FIG. 1 illustrates an exemplary distributed storage architecture in which an intelligent storage media tray can be implemented, according to some embodiments.

FIG. 1 illustrates an exemplary distributed storage architecture 100 in which an intelligent storage media tray 160 can be implemented, according to some embodiments. In the illustrated distributed storage architecture 100, storage servers 105A and 105N are communicatively coupled via a network 107 using signal lines 101. A plurality of intelligent storage media trays 160A(1)-160A(N) is illustrated as residing on storage server 105A, with a separate plurality of intelligent storage media trays 160N(1)-160N(N) residing on storage server 105N. It is to be understood that one or more intelligent storage media trays 160 can reside on more, fewer or different storage servers 105 and/or other computing devices as desired. It is to be understood that the number of intelligent storage media trays 160 residing on any given storage server 105 or other computing device is a variable design parameter, and different numbers of intelligent storage media trays 160 can be housed by different computing devices in different embodiments as desired. Each intelligent storage media tray 160 may house a plurality of storage devices 314 of either the same type or different type. It is to be understood that the storage devices 314 housed on each intelligent storage media tray 160 may be instantiated as electromechanical storage such as hard disks, solid state storage such as flash memory, other types of storage media, and/or combinations of these.

Although intelligent storage media trays 160 are depicted in FIG. 1 as being coupled to two storage servers (105A and 105N) for clarity of illustration, it is to be understood that the intelligent storage media trays 160 can be housed by storage servers 105 in the form of rack mounted computing devices, in a datacenter comprising many large storage racks each housing a dozen or more storage servers 105, hundreds of intelligent storage media trays 160 each housing multiple storage devices 314 and a fast network 107. It is also to be understood that distributed storage architecture 100 can be physically instantiated across multiple datacenters in multiple locations, including different cities or continents.

Further, it is to be understood that although the embodiments described in conjunction with FIGS. 2-8 are directed to implementing an intelligent storage media tray 160 in a distributed storage system 100, in other embodiments the intelligent storage media tray 160 can operate in other storage architectures. As an example of another possible storage architecture according to some embodiments, servers 105A and 105N are depicted as also being connected to a SAN fabric 170 which supports access to intelligent storage media trays 160(1)-160(N), each housing multiple storage devices 314. Intelligent storage array 190 is also shown as an example of a specific storage platform that can accommodate at least one intelligent storage media tray 160, accessible via SAN fabric 170. In yet another embodiment, shared storage can be implemented within an intelligent storage media tray 160 using FC and iSCSI (not illustrated) instead of a SAN fabric 170.

Figure 2A:
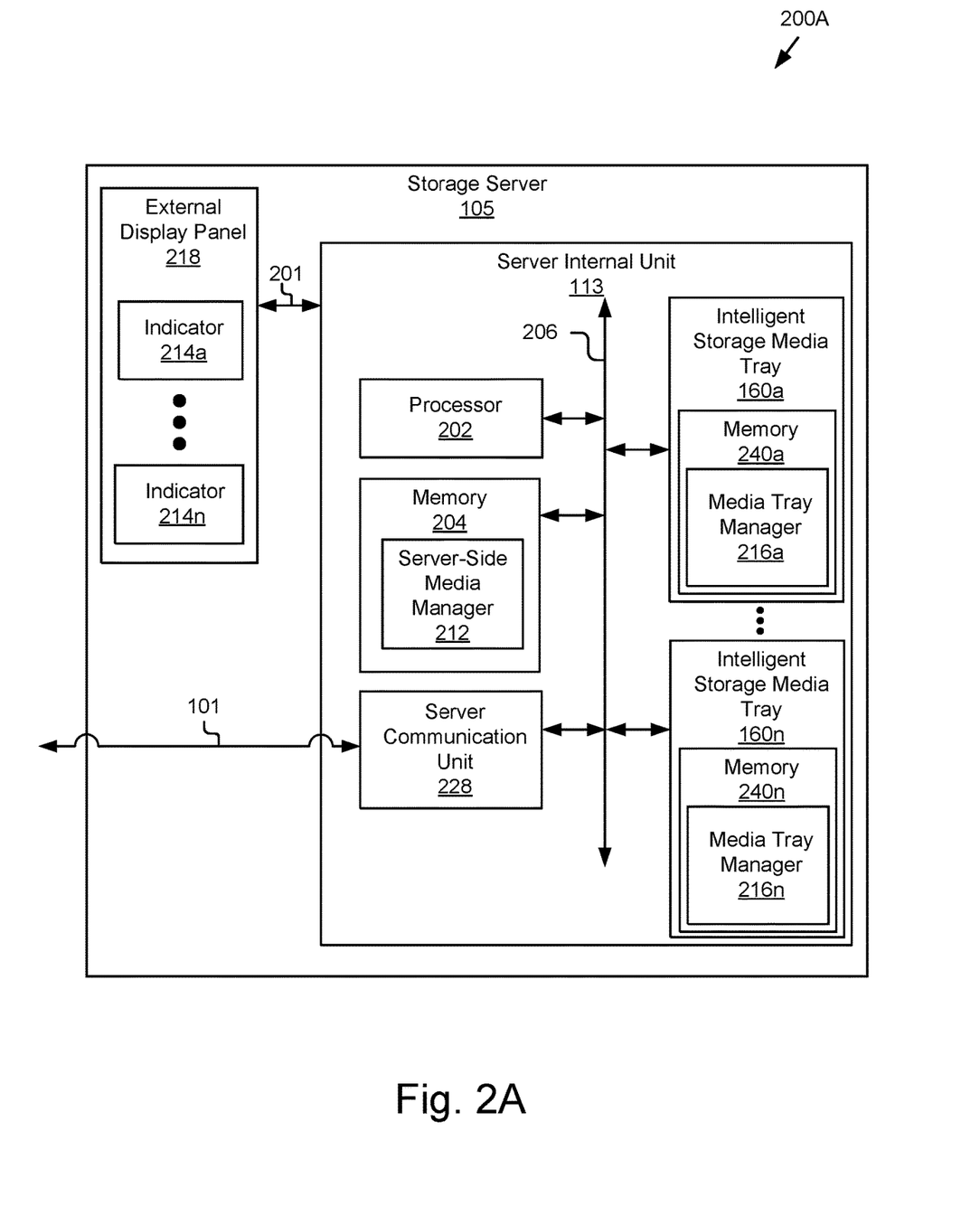
FIG. 2A depicts an exemplary storage server housing a plurality of intelligent storage media trays, according to some embodiments.

FIG. 2A depicts an exemplary storage server 105 housing a plurality of intelligent storage media trays 160a-160n, according to some embodiments. As shown in FIG. 2A, storage server 105 comprises a server internal unit 113 and an external display panel 218. The server internal unit 113 may contain one or more intelligent storage media trays 160 coupled to other components/modules of storage server 105 via signal line 206. In some embodiments, signal line 206 may be a system bus that couples the components of the server internal unit 113. Additionally, the server internal unit 113 may also include a processor 202, memory 204 and other components. In some instances, instructions/logic may be loaded into the memory 204 and executed by the processor 202. In one embodiment, a server-side media manager 212 can reside in the memory 204 and be executed by the processor 202 to facilitate the server-side functionality described herein.

FIG. 2A additionally shows memory 240 in which a media tray manager 216 may reside. As shown in the figure, each intelligent storage media tray 160 contains memory 240 in which a media tray manager 216 can execute to provide the tray-side functionality described in more detail below. For example, the media tray manager 216 may transmit a first control signal to the server-side manager 212 when a storage device 314 fails on the intelligent storage media tray 160 on which the media tray manager 216 resides. As described below in conjunction with FIG. 3, each intelligent storage media tray 160 may contain a processor 202 or other form of control logic which enables execution of the media tray manager 216.

Moreover, storage server 105 may comprise an external display panel 218 coupled to the internal server unit 113 via signal line 201. In one embodiment, the external display panel 218 has one or more visual indicators 214a-214n, at least one of which is a fault indicator 214. This fault indicator 214 is activated to visually indicate that a storage device 314 housed by an intelligent storage media tray 160 within the storage server 105 has failed. Further, another indicator 214 on the external display panel 218 may also be activated to visually indicate the number of failed storage devices 314 within the storage server 105. It is to be understood that the external display panel 218, in some embodiments, is situated on a casing of the storage server 105. When situated on the casing of the storage server 105, the external display panel 218 can provide visual cues to a user (e.g., a datacenter administrator, or technician or the like), to readily identify a specific storage server 105 containing one or more failed storage devices 314. As described in more detail below, external indicators can be implemented in the form of light emitting diodes ("LEDs"), light pipes or other light generating hardware.

Figure 2B:
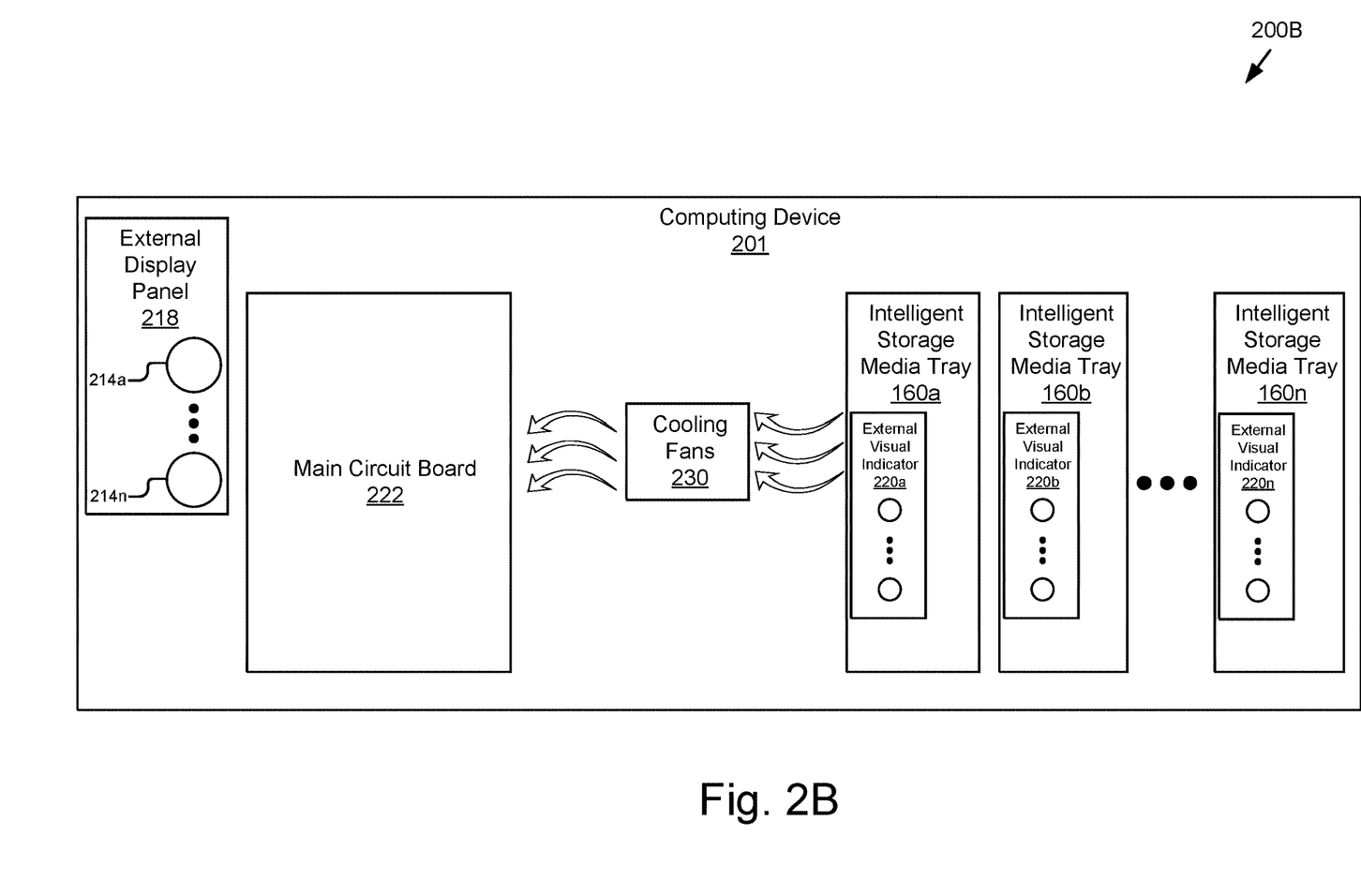
FIG. 2B shows an example computing device housing a plurality of intelligent storage media trays, according to some embodiments.

FIG. 2B shows an example computing device 201 housing a plurality of intelligent storage media trays 160a-160n, according to some embodiments. Computing device 201 may be in the form of a storage server 105 in a distributed storage system 100 having a plurality of storage servers 105, as described above. In some embodiments, the computing device 201 may be in the form of a more general purpose computer capable of housing at least one intelligent storage media tray 160. As shown in FIG. 2B, the computing device 201 comprises an external display panel 218 with a plurality indicators 214a-214n. At least one indicator of the plurality of indicators shown on the external display panel 218 may be the fault indicator 214 described above, which is activated when the server-side media manager 212 receives a first control signal indicating a failure of at least one storage device 314 housed in an intelligent storage media tray 160 coupled to the computing device 201. In some embodiments, at least one of the indicators 214a-214n on the external display panel 218 is also activated to visually indicate how many storage devices 314 housed by the specific intelligent storage media tray 160 have failed.

Also shown in FIG. 2B is a plurality of intelligent storage media trays 160a-160n housed within computing device 201. As shown in the figure, each storage media tray 160 includes one or more external visual indicators 220. Typically, the external visual indicators 220a-220n corresponding to the plurality of intelligent storage media trays 160a-160n are viewable responsive to removing a casing of the computing device. In other embodiments the intelligent storage media trays 160a-160n are coupled to the computing device via a hardware interface such that the external visual indicators 220a-220n corresponding to the plurality of intelligent storage media trays 160a-160n are viewable without removing a casing of the computing device.

Figure 3:
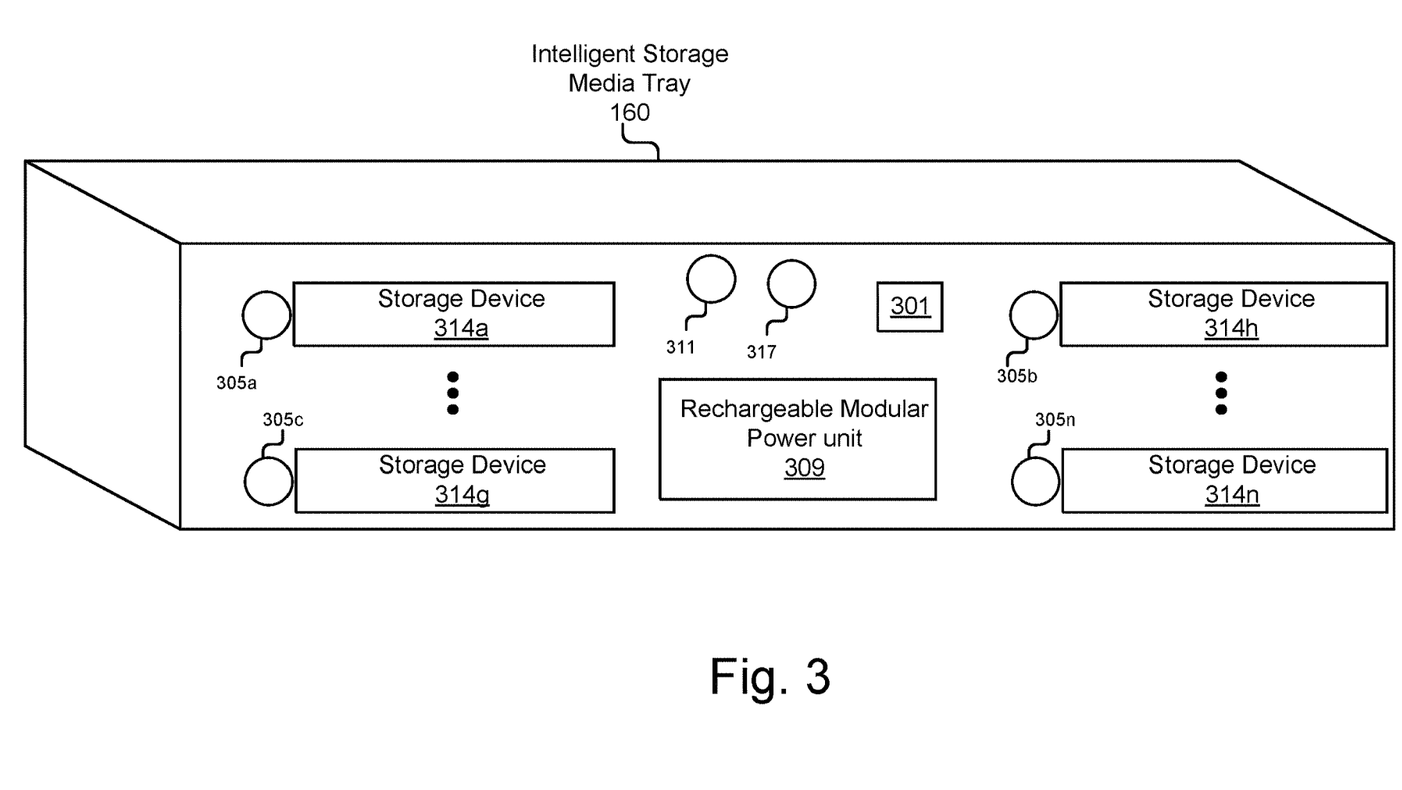
FIG. 3 depicts an example intelligent storage media tray housing a plurality of storage devices, according to some embodiments.

The functionalities of the external visual indicators 220a-220n are further discussed in more detail in conjunction with FIG. 3. For instance, the external visual indicators 220a-220n may facilitate identifying a specific intelligent storage media tray 160 housing a failed storage device 314. For example, a datacenter administrator/technician may see the activated external visual indicator 220 and readily know which intelligent storage media tray 160 to decouple from computing device 201 since each external visual indicator 220, when activated, serves as a visual identifier indicating that the given storage media tray 160 contains at least one failed storage device 314. For instance, external visual indicator 220a corresponds to intelligent storage media tray 160a, external visual indicator 220b corresponds to intelligent storage media tray 160b and external visual indicator 220n corresponds to intelligent storage media tray 160n.

Moreover, the computing device 201 also contains a main circuit board 222 having modules such as processor 202 and memory 204 functioning as described above. Additionally, the main circuit board 222 may also contain other components, such as a server communication unit 228 for communicating with a storage manager (not shown) of the distributed storage system 100.

Additionally, the computing device 201 may also contain one or more cooling fans 230 that are centrally situated to optimally cool both the computing device's circuitry and also, any intelligent storage media trays 160 coupled to the computing device 201. In particular, Laminar airflow theory (i.e. a theory that suggest that when device placement is erratic or random, air should be pulled/sucked over the devices to increase coverage, and for areas that have well designed and static placement to accommodate airflow, air should be pushed/blown) is applied to centrally locate one or more cooling fans 230 within the computing device 201 between the main circuit board 222 and the intelligent media storage trays 160(s). The cooling fans 230 are configured to blow air over main circuit board 222 on which the electronic components (e.g. memory, CPU, etc.) are uniformly lined-up/positioned, while sucking air from the areas of the computing device 201 that house one or more intelligent storage media trays 160. Generally, areas of the computing device 201 that house one or more intelligent storage media trays 160 may have airflow dead spots resulting from the possibly similar or dissimilar sizes and types of storage devices 314 housed within the intelligent storage media tray 160. The dead spots may be indicative of a random structure or arrangement of storage devices 314 hence the sucking of air from such areas. As noted above, such areas are most effectively ventilated and hence cooled by pulling area over them, rather than pushing. The dual application of the Laminar airflow theory in the present disclosure advantageously allows for air to be sucked/pulled and blown/pushed within the computing device 201 to most effectively ventilate these respective areas, thereby resulting in an optimal cooling of all components (computing device circuitry and intelligent storage media trays 160) within the computing device 201.

FIG. 3 depicts an example intelligent storage media tray 160 housing a plurality of storage devices 314a-314n, according to some embodiments. As shown in FIG. 3, intelligent storage media tray 160 may include an actuating member 301. In one embodiment, the actuating member 301 may be a button that can be pressed. In other embodiments, the actuating member 301 may be a switch/toggle which is able to actuate the actuating member 301. Other implementations are possible in other embodiments, such as an audio detection mechanism that detects voice commands. Regardless, a datacenter administrator/technician or the like can actuate the actuating member 301 when s/he is ready to remove the intelligent storage media tray 160 from the storage server 105 to replace the failed storage device 314. The actuation of the actuating member 301 by the user (e.g., the pressing of the button or the like) can activate a first visual indicator 311 on the intelligent storage media tray 160 indicating that the actuation of the member has registered (e.g., the button press has been detected). As described in greater detail below in conjunction with FIG. 7, in response to pressing of the button the media tray manager 216 can transmit a signal to the server-side media manager 212 which can programmatically classify all of the storage devices 314 housed in the specific storage media tray 160 as being out of the distributed storage system 100. The server-side media manager 212 can transmit a corresponding notification to the distributed system 100 indicating the classification, and upon receipt of an acknowledgement from the distributed storage system 100, a second visual indicator 317 on the intelligent storage media tray 160 may be activated, indicating that the intelligent storage media tray 160 may now be safely decoupled from the storage server 105. In one embodiment, the first indicator 311 is in the form of a red or yellow light and the second visual indicator 317 is in the form of a green light indicating that it is safe to proceed with decoupling the intelligent storage media tray 160 housing the failed storage device 314. It is to be understood that in different embodiments the first and second visual indicators may be implemented using light emitting diodes (LEDs), light pipes or other forms of light generating hardware as desired. Other embodiments may have a single indicator such as the first visual indicator 311 implemented as an LED that changes colors. For instance, when the actuating member 301 is actuated, the first visual indicator 311 may show a red or yellow light, which subsequently changes to a green light indicating that it is now safe for the technician to decouple the intelligent storage media tray 160. It is to be understood that these are just examples, and in other embodiments, the visual indicator(s) 311 and 317 can be implemented in other ways as desired.

The intelligent storage media tray 160 may further comprise a plurality of storage devices 314a-314n. Although FIG. 3 depicts four storage devices 314 for clarity of illustration, it is to be understood that more (or fewer) storage devise 314 can be housed in an intelligent storage media tray 160 as desired. Each storage device 314a-314n is associated with a corresponding internal visual indicator 305a-305n, as described in more detail below. In one embodiment, the storage devices 314a-314n are of the same type, whereas in other embodiments different types of storage devices 314 are deployed in a single intelligent storage media tray 160. Storage devices 314 can be coupled to the intelligent storage media tray 160 via bays/hardware interfaces of the same or different types as desired. Some examples of types of storage devices 314 that may be housed in an intelligent storage media tray 160 are magnetic storage devices 314 such as hard disks, and solid state media such as flash disks, although other types of storage media not explicitly mentioned herein are also contemplated.

Internal indicators 305a-305n are situated in specific physical proximity to corresponding storage devices 314a-314n housed in an intelligent storage media tray 160. Each internal indicator of the plurality of internal indicators 314a-314n is activated when a corresponding storage device 314 fails. Thus, a specific failed storage device 314 can be identified by noting the activated internal visual indicator 305 to which the specific failed storage device 314 corresponds. In some embodiments, the internal indicators 305 may be embedded in a casing of or otherwise coupled to the intelligent storage media tray 160, for example proximate to the mounting screw or similar hardware, proximate to or configured as part of the bay or coupling mechanism, such that each storage device 314 housed in the intelligent media tray 160 has a corresponding visual indicator uniquely identifying it based on physical proximity. The exact implementation of the positioning of the internal visual indicators 305 in physical proximity to their corresponding storage devices 314 is a variable design parameter. In general, the internal indicators 305 are positioned in the intelligent storage media tray 160 so that it is clear to the technician which storage device 314 corresponds to which internal visual indicator 305.

Additionally, FIG. 3 shows a rechargeable modular power unit 309 coupled to intelligent storage media tray 160. In one embodiment, the rechargeable modular power unit 309 is a modular uninterruptible power supply (UPS) that is coupled to the intelligent storage media tray 160. In this case, the rechargeable modular power unit 309 is charged when the intelligent storage media tray 160 is coupled to the computing device 201. Because of this charging, modular power unit 309 provides an independent power source that ensures that an activated internal visual indicator 305 and an activated external visual indicator 220 of a specific intelligent storage media tray 160 housing a failed storage device 314 persists after decoupling the specific media tray 160 from the computing device 201. In some embodiments, a persisting internal or external visual indicator may take the form of activated LED(s) on the specific intelligent storage media tray 160 remaining on after the intelligent storage media tray 160 has been decoupled from the computing device 201. A datacenter administrator or technician can use the persisting indicators to easily locate the failed storage device 314 on the specific intelligent storage media tray 160. In another embodiment, rechargeable modular power unit 309 can power other circuitry, such as the memory 204 and processor 222 of the specific intelligent storage media tray 160 so that the electronic circuitry of the specific intelligent storage media tray 160 has power whether coupled to computing device 201 or temporarily decoupled therefrom in order to replace a failed storage device 314.

Furthermore, in some embodiments the server side media manager 212 and/or the media tray manager 216 provide power supply management. For example, this power supply management may, in some embodiments, sequentially power up/power down individual storage devices 314 housed within the intelligent storage media tray 160. This ensures that in-rush/power up current can be controlled so as not to overwhelm the power supply to the computing device 201 to facilitate the reliability of the computing device 201. In other embodiments, the sequential powering allows an individual storage device 314 to be held in a completely "off" state where no power is applied to the individual storage device 314 in question. This allows the computing device 201 to power up the individual storage device 314 as needed to either grow the size of the available storage of the computing device 201, or replace a failed storage device 314 in the computing device 201 to keep the storage capacity of the computing device 201 static. In further embodiments, this sequential powering up/powering down of individual storage devices 314 dynamically removes power individually from a failed or unused storage device 314 to prevent the failed storage device 314 from drawing power from the computing device 201 unnecessarily.

In one embodiment, the casing of the intelligent storage media tray 160 is structured to serve as a heat sink for the storage devices 314 housed therein. For example, the casing of the storage media tray 160 may be based on a black anodized construction that allows for increased heat removal due to blackbody radiation.

It is to be understood that although the server-side media manager 212 and the media tray manager 216 are illustrated as single entities, these components represents collections of functionalities, which can be instantiated as a single or multiple modules as desired. It is to be understood that modules of the server-side media manager 212 and/or the media tray manager 216 can be instantiated (for example as object code or executable images) within the system memory (e.g., RAM, ROM, flash memory) of a computing device, such that when the processor of the computer system processes a module, the computing device executes the associated functionality. These modules may also be instantiated as control logic, hardware, firmware, or any combination of software, hardware and firmware. As used herein, the terms "computer system," "computer," "client," "client computer," "server," "server computer" and "computing device" mean one or more computers configured and/or programmed to execute the described functionality. Additionally, program code to implement the functionalities of the server-side media manager 212 and the media tray manager 216 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Furthermore, the intelligent storage media tray 160 in some embodiments, is rigidly structured with feet at its corners to allow for direct weight transfer from storage devices 314 to the rails of a data center rack to which a storage server 105 housing the storage media tray 160 is coupled. This allows for thinner gauge build materials to be used for constructing the intelligent storage media tray 160 without needing to put in folds or strengthening ribs which consequently leads to a larger cross-sectional airflow and cooling of the intelligent storage media tray 160. Because of the structural durability of the intelligent storage media tray 160, the reliability of the intelligent storage media tray's components (e.g. memory having logic for controlling operation of the intelligent media tray 160) and associated electrical connections are not compromised by the weight of storage devices 314 (i.e. storage devices 314 with similar weights or dissimilar weights or a combination of both) which could otherwise potentially create a bowing of the intelligent storage media tray 160.

Additionally, the intelligent storage media tray 160 in some embodiments is configured with the capacity for shock/vibration isolation. Specifically, the intelligent storage media tray 160 may incorporate two layers of shock/vibration isolation for the intelligent storage media tray 160. The first layer (i.e. isolation of shock and/or vibration from sources external to the intelligent storage media tray 160) comprises shock/vibration isolation of the intelligent storage media tray 160 from the computing device 201. This is accomplished by mechanically configuring the spacing between the intelligent storage media tray 160 and the chassis of the computing device 201 to which the intelligent storage media tray 160 is coupled to account for possible shock or vibration transfer. This first layer of isolation also ensures that the storage devices 314 housed within the intelligent storage media tray 160 remain unaffected by vibration or shock during, for example, removing an intelligent storage media tray 160 having at least one storage device 314 from a box or other packaging container prior to installation/coupling to the computing device 201. Even during the identification and replacement of a failed storage device, the first layer of isolation also protects the storage devices 314 of the intelligent storage media tray 160 from shocks and vibrations resulting from the user's (e.g. technician's) handling of the intelligent storage media tray 160.

The second layer (i.e. isolation of shock and/or vibration from sources internal to the intelligent storage media tray 160) of isolation occurs within the intelligent storage media tray 160 itself. Here, each individual storage device 314 within the intelligent storage media tray 160 is vibration and/or shock isolated from other storage device 314 of the intelligent storage media tray 160. Thus, the combination of these two layers of isolation results in a superior shock and vibration isolation for the intelligent storage media tray 160 when compared to conventional storage systems.

In addition, in some embodiments, the computing device 201 and the intelligent storage media tray 160 may be structured to allow for tool-less coupling and decoupling of the intelligent storage media tray 160 from the computing device 201. In some embodiments, this tool-less feature extends to the storage devices 314 housed by the intelligent storage media tray 160 where storage devices 314 may also be coupled and decoupled from the intelligent storage media tray 160 without requiring any tools. This is principally because in these embodiments no screws or other fastening members hold storage devices 314 in place within the intelligent storage media trays 160. Neither are any screws used to fasten the intelligent storage media trays 160 to the computing device 201. Rather, mechanical pressure mechanisms (not shown in figures) are used to firmly couple the storage devices 314 to the intelligent storage media trays 160 which are in turn coupled using other mechanical pressure mechanisms to the computing device 201. The stated mechanical pressure mechanisms require no tools for the coupling and decoupling of storage media trays 160 and storage devices 314.

Figure 4:
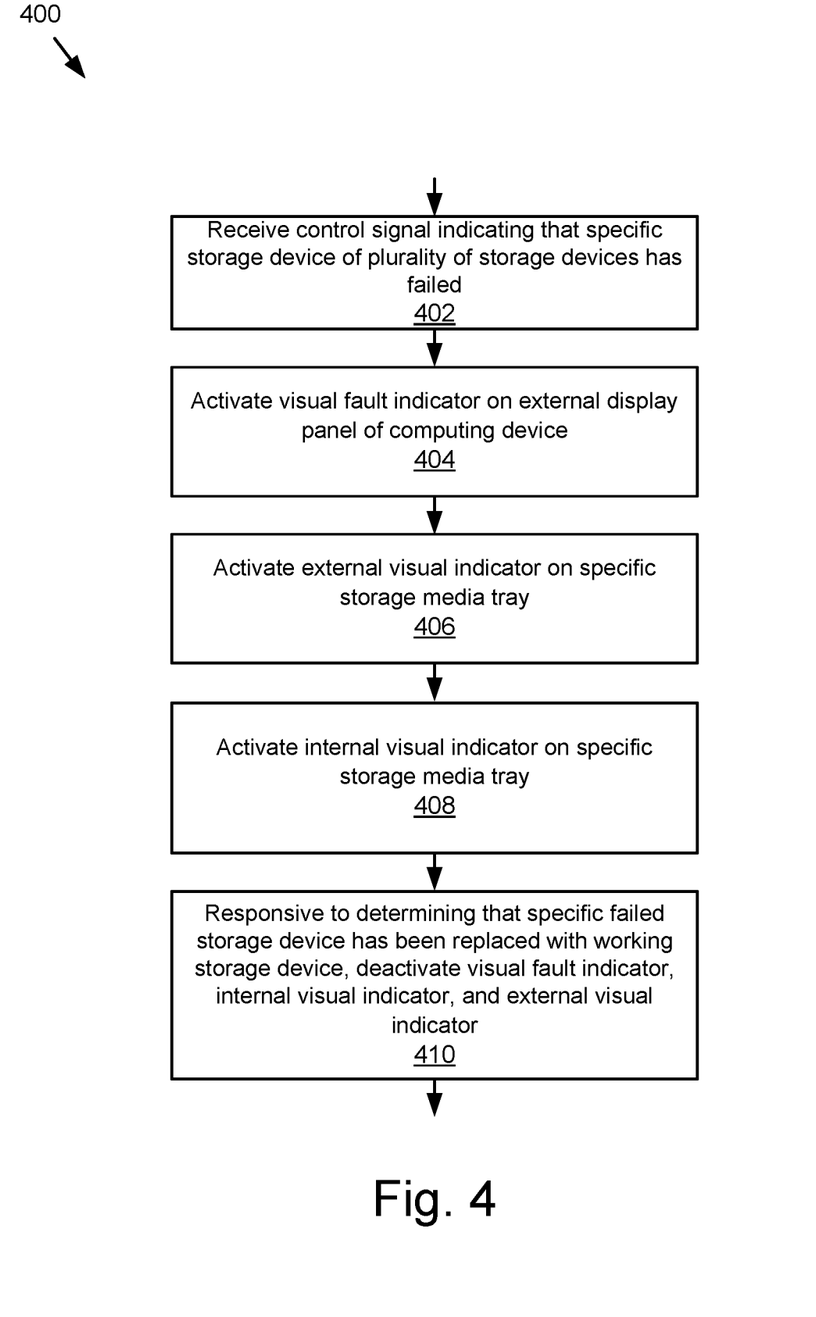
FIG. 4 is a flowchart illustrating steps for identifying and safely replacing a specific failed storage device housed in a specific intelligent storage media tray, according to some embodiments.

FIG. 4 is a flowchart illustrating steps 400 for identifying and safely replacing a specific failed storage device 314 housed in a specific intelligent storage media tray 160, according to some embodiments. At block 402, the server-side media manager 212 receives a first control signal indicating that a specific storage device 314 of the plurality of storage devices 314 housed on a specific intelligent storage media tray 160 housed by the storage server 105 (or other computing device 201) has failed. In one embodiment, the first control signal is transmitted via a bus or signal line or interfaces coupling the specific intelligent storage media tray 160 to the storage server 105. For example, the media tray manager 216 on the intelligent storage media tray 160 may execute, detect the failed storage device 314, and send the first control signal via bus 206 to the server-side media manager 212 as shown in FIG. 2A.

At block 404, the server-side media manager 212 activates a visual fault indicator 214 on an external display panel 218 such as the external display panel 218 of the computing device 201 (e.g., storage server 105) shown in FIG. 2B. Recall that the visual fault indicator 214 on the external display panel 218 of the storage server 105 indicates that the storage server 105 contains a failed storage device 314. This enables a technician in a datacenter to easily identify those storage servers 105 which contain failed storage devices 314, for example just by walking up and down the aisles and identifying activated visual fault indicators 214 on the external display panels 218 of given storage servers 105. This is significant, since there could be thousands of storage servers 105 in the datacenter.

At block 406, the media tray manager 216 may activate an external visual indicator 220, such as the external visual indicator 220 depicted in FIG. 2B, on the specific intelligent storage media tray 160 containing the failed storage device 160 housed in the storage server 105. Recall that the external visual indicator 220 indicates that the specific intelligent storage media tray 160 contains a failed storage device 160. This enables the technician to easily identify specific storage media trays 160 within storage servers that need to be pulled in order to change failed storage devices 314. For example, when the technician removes the face plate of a storage server containing a failed storage device 314, the specific storage media tray containing 160 containing the failed storage device 314 can be readily identified by the activated external visual indicator 220, even where there are many separate media storage trays 160 in the storage server 105.

At block 408, the media tray manager 216 may activate an internal visual indicator 305 on the specific intelligent storage media tray 160 within a specific physical proximity to the failed storage device 314, as shown in FIG. 3. Once the specific storage media tray containing 160 containing the failed storage device 314 has been decoupled from the storage server 105, the activated internal visual indicator 305 identifies which of the multiple storage devices 314 therein have failed. Recall that the activated internal visual indicator 305 may be positioned in a specific physical proximity to the specific failed storage device 314 as described above, thereby readily identifying which storage device 314 has failed.

At block 410, the visual fault indicator 214, the internal visual indicator 305, and the external visual indicator 220 may be deactivated responsive to determining that the failed storage device 314 has been replaced with a working storage device 314. The operations performed at block 410 may be performed by the server-side media manager 212 and the media tray manager 216. As explained above, activating the visual fault indicator 214, the internal visual indicator 305, and the external visual indicator 220 may comprise turning on corresponding LEDs. Deactivating these indicators may comprise turning off the corresponding LEDs for each indicator.

Figure 5:
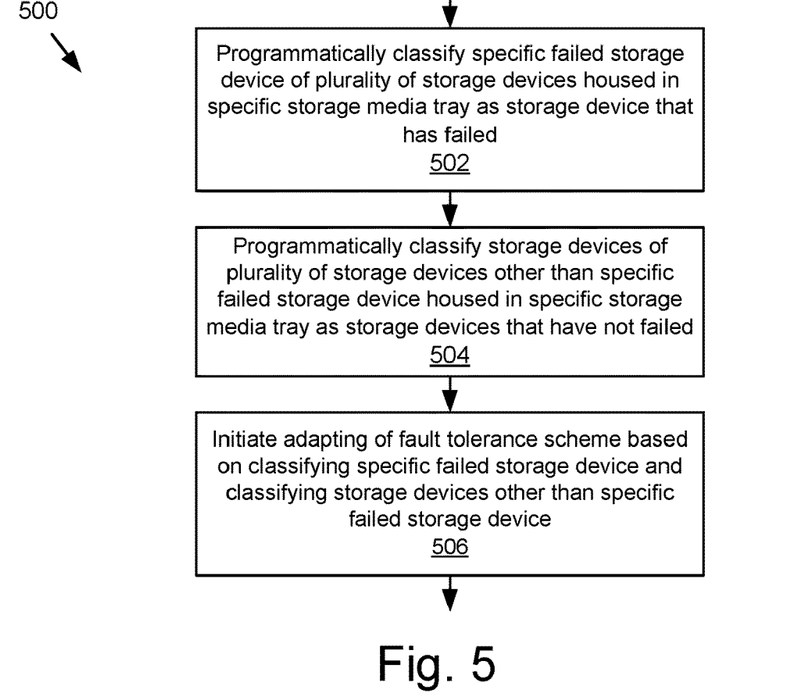
FIG. 5 a is flowchart illustrating steps for classifying failed storage devices and working storage devices, according to some embodiments.

FIG. 5 is a flowchart illustrating steps 500 for classifying failed storage devices 314 and working storage devices 314, according to some embodiments. At block 502, the specific failed storage device 314 of a plurality of storage devices 314 housed in the specific intelligent storage media tray 160 is programmatically classified as a storage device 314 that has failed. This may occur responsive to the server-side media manager 212 receiving the first control signal as described above. Further, at block 504 the storage devices 314 of the plurality of storage devices 314 other than the specific failed storage device 314 housed in the specific intelligent storage media tray 160 are programmatically classified as storage devices 314 that have not failed. These classifications may be performed by the server-side media manager 212 in response to receiving the first control signal. At block 506, the server-side media manager 212 initiates the adapting of the data replication fault-tolerant scheme of the distributed storage system 100 based on the classifications (i.e. classifying the specific failed storage device 314 and classifying storage devices 314 other than the specific failed storage device 314). The initiation of the adaption can be performed, for example, by transmitting a notification of the classifications to the storage manager of the distributed storage system 100. In some embodiment, this adapting itself is performed by the storage manager of the distributed storage system 100 in response to receiving the notification.

Figure 6:
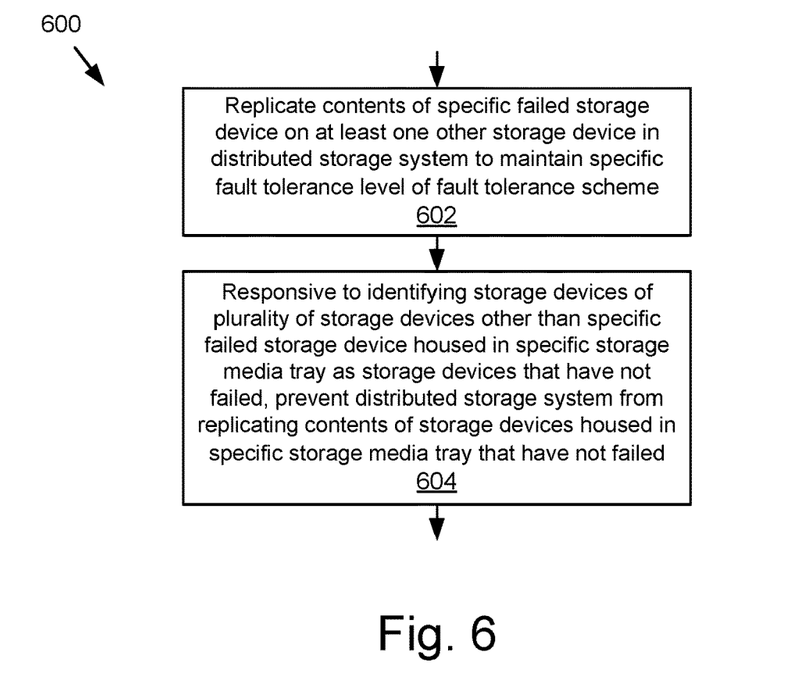
FIG. 6 is a flowchart illustrating steps for adapting a fault-tolerant scheme of the distributed storage system, according to some embodiments.

FIG. 6 is a flowchart illustrating steps for adapting a fault-tolerant scheme of the distributed storage system 100, according to some embodiments. At block 602, the contents of the specific failed storage device 314 is replicated on at least one other storage device 314 in the distributed storage system 100 to maintain a specific fault tolerance level of the fault-tolerant scheme. In one embodiment, this operation is performed by the storage manager of the distributed storage system 100 to ensure that the distributed storage system 100 stays robust after the failure of the specific failed storage device 314.

At block 604, responsive to identifying storage devices 314 of the plurality of storage devices 314 other than the specific failed storage device 314 housed in the specific intelligent storage media tray 160 as storage devices 314 that have not failed, the distributed storage system 100 is prevented from replicating the contents of these storage devices 314. This step may ensure that the distributed storage system 100 does not treat the removal of healthy/working storage devices 314 as failed storage devices 314 when decoupled from the distributed storage system 100. Thus, the contents of the working storage devices 314 are not replicated when decoupled from the distributed storage system 100.

Figure 7:
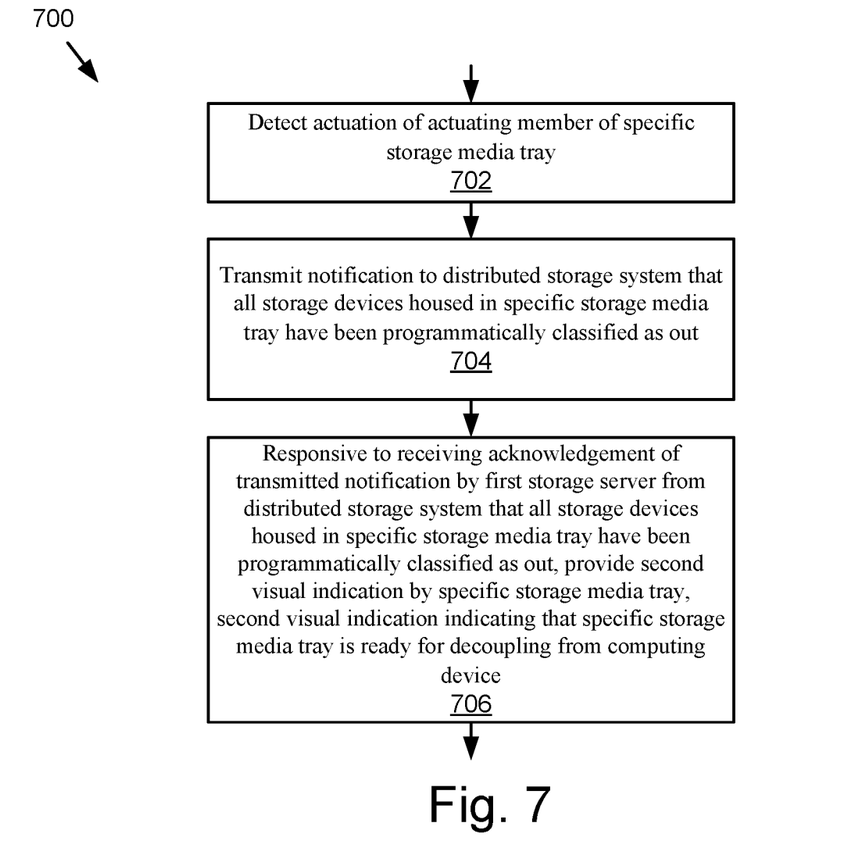
FIG. 7 is a flowchart illustrating steps for providing visual indications responsive to actuating an actuating member of the intelligent storage media tray, according to some embodiments.

FIG. 7 is a flowchart illustrating steps for providing visual indications responsive to actuation of the actuating member 301 of the intelligent storage media tray 160, according to some embodiments. At block 702, the media tray manager 216 detects that the actuating member 301 of the intelligent storage media tray 160 has been actuated. In one embodiment, actuating the actuating member 301 of the intelligent storage media tray 160 comprises pressing a button on the intelligent storage media tray 160 as noted above. Recall that the technician can press the button when ready to decouple the intelligent storage media tray 160 from the storage server 105 in order to replace the failed storage device 314. In response to detection of the actuation (e.g., the pressing of the button), the media tray manager 216 may activate the indicator 311 to indicate that the button press has been detected, as described above. For example, activating the indicator 311 can take the form of lighting a yellow or red LED to indicate that the button press has been detected, but it is not yet safe to remove the storage media tray 160 from the storage server 105.

At block 706, all of the storage devices 314 housed in the specific storage media tray 160 are programmatically classified as being out of the distributed storage system 100, so that the specific storage media tray 160 can be safely decoupled from the storage server 105. At block 706, the server-side media manager 212 may transmit a notification to the distributed storage system 100 that all of the storage devices 314 housed in the specific intelligent storage media tray 160 have been programmatically classified as out. In some embodiments, this notification is transmitted via a computer network to which the first storage server 105 and the storage manager of the distributed storage system 100 are coupled. At block 708, responsive to receiving an acknowledgment of the transmitted notification by the storage server 105 from the distributed storage system 100, the media tray manager 216 provides a second visual indication, indicating to the technician that the storage media tray 160 may now be safely decoupled from the storage server 105. This second visual indication may comprise an activation of indicator 317 (e.g., lighting a green LED as described above).

As will be understood by those skilled in the art, the invention may be embodied in other specific forms without departing from the spirit or essential characteristics thereof. Likewise, the particular naming and division of the portions, modules, servers, managers, components, functions, procedures, actions, layers, features, attributes, methodologies, data structures and other aspects are not mandatory or significant, and the mechanisms that implement the invention or its features may have different names, divisions and/or formats. The foregoing description, for the purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for identifying and replacing a failed storage device, the method comprising:
   receiving a first control signal indicating that a specific storage device of a plurality of storage devices has failed, the plurality of storage devices being housed in a specific storage media tray, the specific storage media tray comprising an internal visual indicator, an external visual indicator and a control logic, the specific storage media tray being housed in a computing device; responsive to receiving the first control signal, activating a visual fault indicator on an external display panel of the computing device, and activating the external visual indicator on the specific storage media tray;
   wherein the visual fault indicator on the external display panel of the computing device indicates that the computing device contains a storage media tray housing a failed storage device;
   wherein the external visual indicator on the specific storage media tray indicates that the specific storage media tray houses a failed storage device, the external visual indicator on the specific storage media tray being viewable while the specific storage media tray is housed in the computing device;
   activating the internal visual indicator on the specific storage media tray, the internal visual indicator on the specific storage media tray identifying the specific failed storage device in the specific storage media tray; and
   responsive to determining that failed storage device has been replaced with a working storage device, deactivating the visual fault indicator, the internal visual indicator, and the external visual indicator.

2. The computer-implemented method of claim 1, wherein:
   the external display panel of the computing device further comprises a second indicator, the second indicator visually indicating how many storage devices have failed.

3. The computer-implemented method of claim I wherein:
   the computing device further comprises a first storage server of a plurality of storage servers in a distributed storage system, the plurality of storage servers being communicatively coupled to each other to facilitate retrieving and storing data in a fault tolerant scheme providing data replication.

4. The computer-implemented method of claim 3 further comprising:
   programmatically classifying the specific failed storage device of the plurality of storage devices housed in the specific storage media tray as a storage device that has failed; programmatically classifying storage devices of the plurality of storage devices other than the specific failed storage device housed in the specific storage media tray as storage devices that have not failed; and
   initiating adapting of the fault tolerance scheme based on classifying the specific failed storage device and classifying storage devices other than the specific failed storage device, the adapting comprising:
   replicating contents of failed storage device on at least one other storage device in the distributed storage system to maintain a specific fault tolerance level of the fault tolerance scheme; and responsive to identifying storage devices of the plurality of storage devices other than the specific failed storage device housed in the specific storage media tray as storage devices that have not failed, preventing the distributed storage system from replicating contents of the storage devices housed in the specific storage media tray that have not failed.

5. The computer-implemented method of claim 4, further comprising:
   responsive to detecting actuation of an actuating member of the specific storage media tray:
   providing a first visual indication by the specific storage media tray, the first visual indication indicating that the actuating member has been actuated; and programmatically classifying all storage devices housed in the specific storage media tray as out of the distributed storage system; transmitting, by the first storage server to the distributed storage system, a notification that all storage devices housed in the specific storage media tray have been programmatically classified as out; and responsive to receiving acknowledgment of the transmitted notification by the first storage server from the distributed storage system that all storage devices housed in the specific storage media tray have been programmatically classified as out, providing a second visual indication by the specific storage media tray, the second visual indication indicating that storage media tray is ready for decoupling from the computing device.

6. The computer-implemented method of claim 5, wherein: actuation of the actuating member comprises pressing a button.

7. The computer-implemented method of claim 5, wherein:
the first visual indication is a light emitting diode (LED) on the specific storage media tray visible externally without decoupling the specific storage media tray from the computing device.

8. The computer-implemented method of claim 5, wherein:
the second visual indication is a light emitting diode (LED) on the specific storage media tray visible externally without decoupling the specific storage media tray from the computing device.

9. The computer-implemented method of claim 1, wherein:
the external visual indicator on the specific storage media tray becomes viewable responsive to moving a casing of the computing device.

10. The computer-implemented method of claim 1, wherein:
the internal visual indicator on the specific storage media tray is positioned in a specific physical proximity to the specific failed storage device.

11. The computer-implemented method of claim 1, wherein:
determining that failed storage device has been replaced with the working storage device further comprises detecting that the specific storage media tray has been recoupled to the computing device.

12. The computer-implemented method of claim 1, wherein:
the visual fault indicator, the internal visual indicator, and the external visual indicator comprise light emitting diodes (LEDs).

13. The computer-implemented method of claim 1, wherein:
the fault indicator, the internal visual indicator, and the external visual indicator comprise light pipes.

14. The computer-implemented method of claim 1, wherein:
the internal visual indicator further comprises a plurality of visual indicators, each visual indicator of the plurality of visual indicators being positioned in a specific physical proximity to a corresponding storage device of the plurality of storage devices housed by the specific storage media tray, such that each visual indicator of the plurality of visual indicators is activated responsive to a failure of the corresponding storage device of the plurality of storage devices housed by the specific storage media tray.

15. The computer-implemented method of claim 1, wherein:
the plurality of storage devices housed by the specific storage media tray are of a same type.

16. The computer-implemented method of claim 1, wherein:
the plurality of storage devices housed by the specific storage media tray are of a different type.

17. The computer-implemented method of claim 1, wherein:
the specific storage media tray further comprises a rechargeable modular power unit, the rechargeable modular power unit causing an activated internal visual indicator and an activated external visual indicator of the specific storage media tray to persist responsive to the specific storage media tray being decoupled from the computing device, the modular rechargeable power unit being chargeable when the specific storage media tray is coupled to the computing device.

18. The computer-implemented method of claim 1, wherein:
the computing device houses a plurality of storage media trays, each storage media tray of the plurality of storage media trays comprising an internal visual indicator, an external visual indicator and a control logic, each storage media tray of the plurality of storage media trays housing a plurality of storage devices.

19. A storage media tray comprising: an internal visual indicator and an external visual indicator; a plurality of bays for housing a plurality of storage devices; and a first control logic, the first control logic being executable to communicate with a second control logic to facilitate safely decoupling a specific failed storage device housed on the storage media tray, the second control logic being external to the storage media tray; a rechargeable modular power unit, the rechargeable modular power unit causing an activated internal visual indicator and an activated external visual indicator of the storage media tray to persist after decoupling the storage media tray from a computing device, the modular rechargeable power unit being chargeable when the storage media tray is coupled to the computing device; wherein the external visual indicator on the specific storage media tray indicates that the specific storage media tray houses a failed storage device, the external visual indicator on the specific storage media tray being viewable while the specific storage media tray is housed in the computing device; activating the internal visual indicator on the specific storage media tray, the internal visual indicator on the specific storage media tray identifying the specific failed storage device in the specific storage media tray; and responsive to determining that failed storage device has been replaced with a working storage device, deactivating the internal visual indicator and the external visual indicator.

20. The storage media tray of claim 19, wherein:
the internal visual indicator and the external visual indicator comprise light emitting diodes (LEDs).

21. The storage media tray of claim 19, wherein: the internal visual indicator and the external visual indicator comprise light pipes.

22. The storage media tray of claim 19, wherein:
the plurality of bays comprise different hardware interfaces for coupling a plurality of different storage devices.

23. The storage media tray of claim 19, wherein:
the internal visual indicator identifies the specific failed storage device housed on the storage media tray, the internal visual indicator being positioned in a specific physical proximity to the specific failed storage device.

24. The storage media tray of claim 19, wherein the external visual indicator indicates that the storage media tray houses a failed storage device.

25. The storage media tray of claim 19, wherein:
the storage media tray is housed by a computing device having the second control logic, the computing device comprising a first storage server of a plurality of storage servers in a distributed storage system, the plurality of storage servers being communicatively coupled to each other to facilitate retrieving and storing data in a fault tolerant scheme providing data replication.

26. The storage media tray of claim 25, wherein:
the storage media tray further comprises an actuating member, the actuating member when actuated, provides:
a first visual indication by the storage media tray, the first visual indication indicating that the actuating member has been actuated; and a programmatic classification of all storage devices housed in the storage media tray as out of the computing device.

27. The storage media tray of claim 19, further comprising:
a casing that is structured to serve as a heat sink for each storage device of the plurality of storage devices housed by the storage media tray.

28. The storage media tray of claim 19, wherein:
the casing of the storage media tray is based on a black anodized construction that allows for increased heat removal due to blackbody radiation.

29. The storage media tray of claim 19, wherein:
the storage media tray is shock isolated and vibration isolated from:
shock and vibration sources external to the storage media tray, and shock and vibration sources internal to the storage media tray.

30. The storage media tray of claim 19, wherein:
the storage media tray is coupled to a computing device via a first mechanical pressure mechanism, the first pressure mechanism requiring no tool for coupling the storage media tray to the computing device and decoupling the storage media tray from the computing device; and one or more storage devices are coupled to the storage media tray via a second mechanical pressure mechanism, the second pressure mechanism requiring no tool for coupling the one or more storage devices to the storage media tray and decoupling the one or more storage devices from the storage media tray.

31. The storage media tray of claim 19, wherein:
a plurality of storage devices is coupled to the storage media tray, such that each storage device of the plurality of storage devices is individually powered up or powered down based on:
a failure status of a storage device of the plurality of storage devices; storage needs of a storage system to which the storage media tray is coupled; and system reliability needs of the storage system.

32. The storage media tray of claim 19, wherein:
the storage media tray is coupled to a computing device with uniformly structured electronic components, and one or more cooling fans centrally located within the computing device, such that:
the one or more cooling fans blow air over the uniformly structured electronic components of the computing device; and the one or more cooling fans suck air from areas of the computing device housing the storage media tray.

33. The storage media tray of claim 19, wherein:
the storage media tray is structured using thin gauge build materials without needing strengthening folds, such that, the structure of the storage media tray is unaffected by weights of one or more storage devices coupled to the storage media tray.

* * * * *